Figure 1:
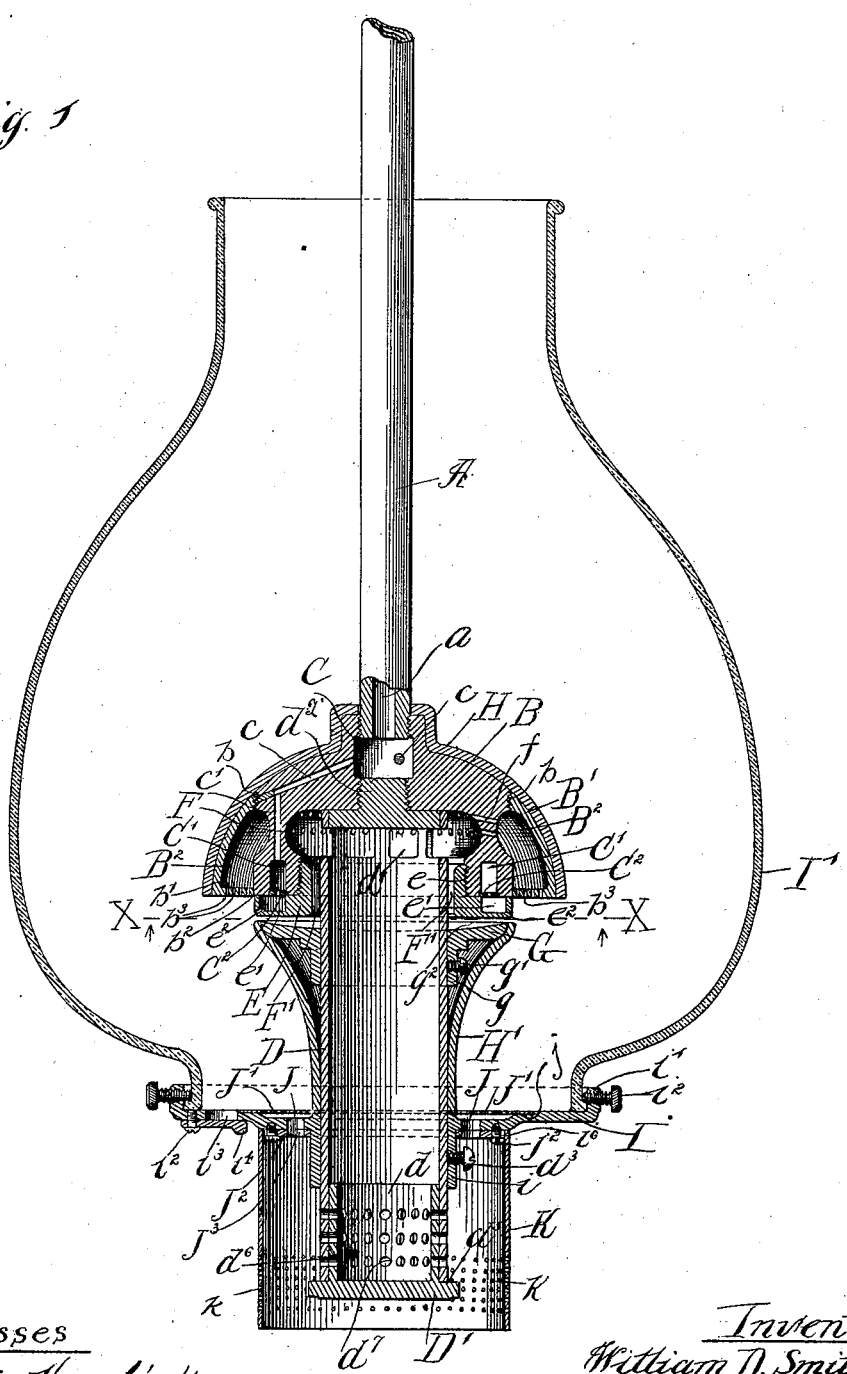

(No Model.) 3 Sheets—Sheet 1.

W. D. SMITH.
GAS BURNER.

No. 593,785. Patented Nov. 16, 1897.

Witnesses
L. Clinton Hamlink
John W. Adams

Inventor
William D. Smith
by Dayton Poole Brown
his Attorneys

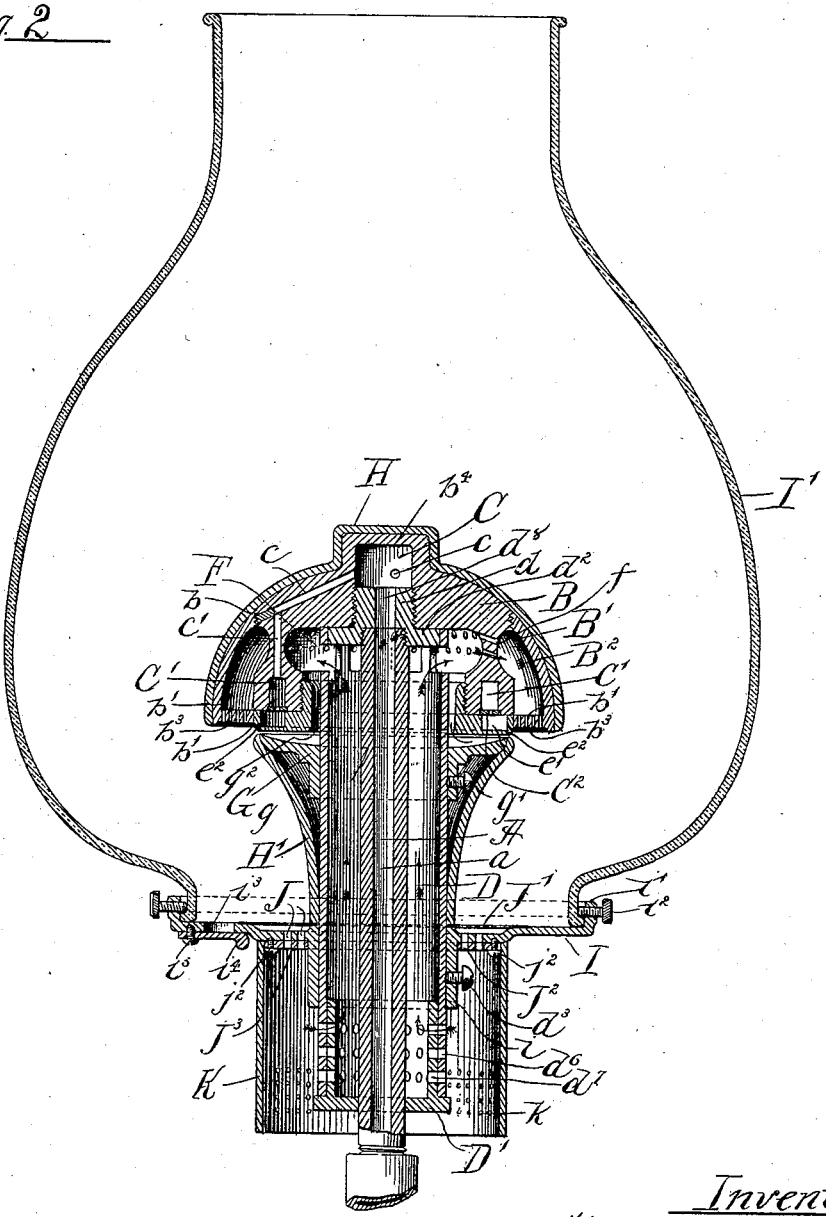

(No Model.) 3 Sheets—Sheet 3.
W. D. SMITH.
GAS BURNER.
No. 593,785. Patented Nov. 16, 1897.
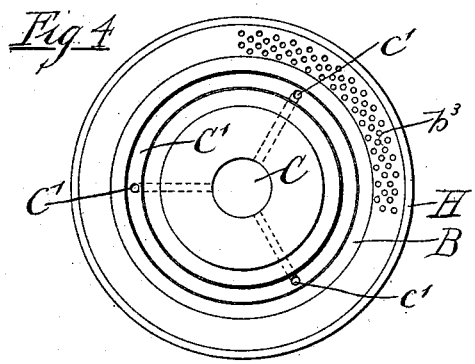
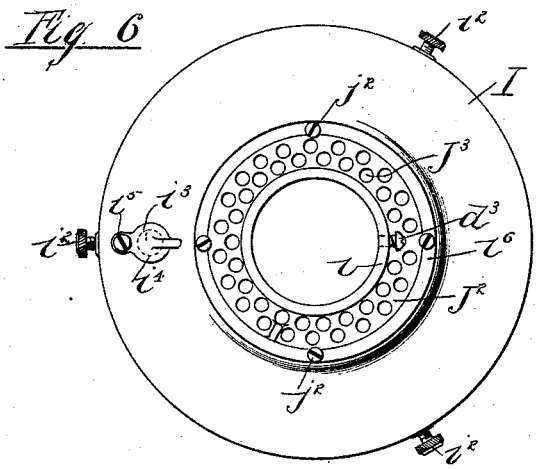
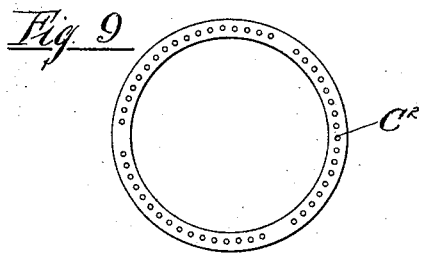
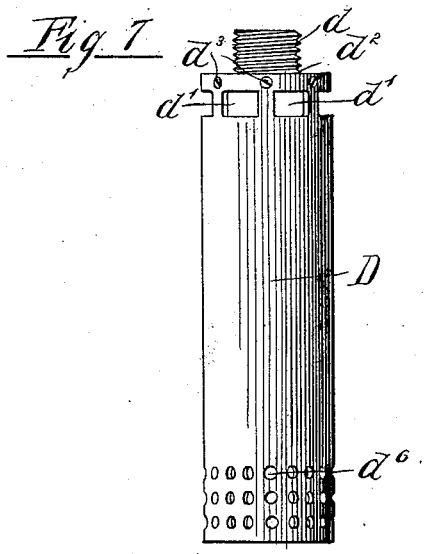
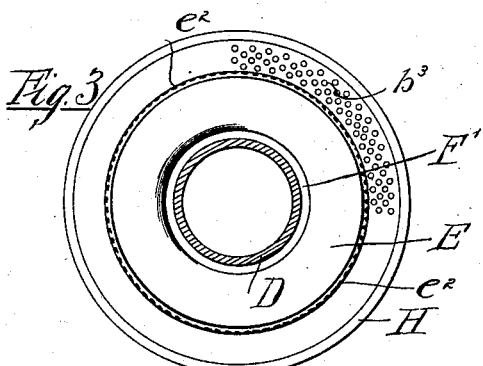
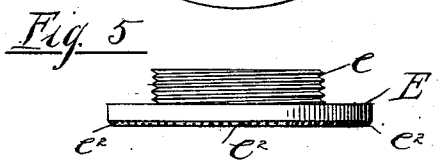
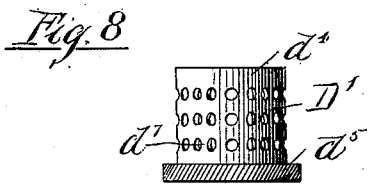
Witnesses
L. Clinton Hamlin
John W. Adams
Inventor
William D. Smith
by Dayton Poole Brown
his Attorneys
THE NORRIS PETERS CO., PHOTO-LITHO., WASHINGTON, D. C.

UNITED STATES PATENT OFFICE.

WILLIAM D. SMITH, OF CHICAGO, ILLINOIS, ASSIGNOR OF TWO-THIRDS TO FRANKLIN W. DANIELS AND W. JAY ANDERSON, OF SAME PLACE.

GAS-BURNER.

SPECIFICATION forming part of Letters Patent No. 593,785, dated November 16, 1897.

Application filed January 6, 1896. Serial No. 574,508. (No model.)

*To all whom it may concern:*

Be it known that I, WILLIAM D. SMITH, of Chicago, in the county of Cook and State of Illinois, have invented certain new and useful Improvements in Gas-Burners; and I do hereby declare that the following is a full, clear, and exact description thereof, reference being had to the accompanying drawings, and to the letters of reference marked thereon, which form a part of this specification.

This invention relates to gas-burners, and has for its object the production of a very white brilliant light with an economical use of gas as the result of the use of a burner of economical construction. In order to cause the carbon of the gas to become most luminous, it is necessary to have the air-supply under proper control and also to have the air-supply in contact with the gas in certain relations. I have found by experiment that to produce the best results it is desirable to have the gas issue from the burner at certain points and to have air supplied to the gas both above and below this point of gas-exit, as by such arrangement the proper admixture of air and gas is obtained.

The nature of the invention and the results which follow from it will be readily comprehended by reference to the accompanying drawings and the subjoined description and will be more particularly pointed out in the appended claims.

In said drawings, Figure 1 illustrates a vertical sectional view of a gas-burner embodying my invention of the type suspended from above. Fig. 2 is a similar view illustrating the burner supported from below. Fig. 3 is a bottom view or section taken on line X X of Fig. 1 between the spreader-plate and burner, looking in the direction indicated by the arrows. Fig. 4 is a similar view with the burner removed. Fig. 5 is the burner proper detached. Fig. 6 is a bottom view of the chimney-holder. Figs. 7 and 8 are detached views showing the air-supply pipe and the adjustable flanged air-spreader. Fig. 9 is a bottom plan view of the perforated ring which separates the annular chamber in the lower part of the main body from the chamber of the burner proper.

In said drawings, referring now more particularly to Fig. 1, A represents any suitable depending gas-supply pipe provided at its lower end with screw-threads and engaging the interiorly-screw-threaded aperture in the upper part of the body portion B. This body portion B is in two parts, the lower portion or extension B' being secured to the body portion proper by screw-threads at $b$ and giving to the whole a hemispherical contour. The lower end of the part B' is provided with an interiorly-directed annular flange $b'$, the inner margin of which fits snugly against the exterior lower portion of the main body portion B, as shown at $b^2$. An annular air-chamber $B^2$ is thus formed between the part B', the inturned flange $b'$, and the exterior margin of the body portion B. Vertically-directed apertures $b^3$ extend through the said flange $b'$ and afford communication to the chamber $B^2$.

The gas-pipe A is provided interiorly with the usual aperture $a$, through which the supply of gas will pass from the source of supply to the interior of the body portion B, first entering a chamber C, formed in the upper end of the body portion B, and which chamber is closed by the screw-threaded plug $d$ of the main air-inlet pipe D. From the gas-chamber C there extends radially and downwardly directed gas-passages $c$, in this instance three in number, but there may be more or less of these passages. In the lower portion of the body portion B is an annular gas-chamber C', and at convenient points this chamber C' is connected with the radial passage-ways $c$ by other passage-ways $c'$, vertically arranged, as clearly shown. A suitable wire-netting or annular apertured plate $C^2$ is arranged to cover the lower side of the annular gas-chamber C'. Gas thus comes in from the source of supply through the pipe A into the chamber C, passes radially through the passages $c$ $c'$ into the annular chamber C', and is then evenly distributed through the apertured plate $C^2$.

Next describing the burner proper, the same consists of an annular plate or ring E, provided on one side with an upwardly-extending exteriorly-screw-threaded hub $e$. An annular groove $e'$, constituting a gas-chamber, is formed in the upper side of the burner E exterior to the hub $e$, the diameter of the burner and the location of the chamber $e'$ being such that the latter will register with the gas-chamber $C'$, or, more properly speaking, with the apertures in the plate $C^2$. At the lower outer margin or corner of the burner E are arranged a plurality of openings or apertures $e^2$, which communicate with the interior of the gas-chamber $e'$. These apertures $e^2$ are preferably given an inclined direction, as shown. The interior of the body portion B is apertured, as shown, and its lower interior margin is provided with screw-threads which engage the screw-threads on the exterior of the hub $e$, whereby the burner E is removably secured in position against the under side of the body portion B. While the perforated plate $C^2$ may in some cases be dispensed with, I prefer to use it between the gas-chambers $C'$ and $e'$, as it tends to equalize the distribution of gas and cause the latter to flow more evenly through the burner-openings $e^2$.

The main air-supply pipe D is preferably tubular in form and will usually be provided with a plurality of radial openings $d'$ near its upper end. Said pipe D is closed at its said upper end by a head-cap $d^2$, suitably secured to the tube D by screw-threads or otherwise. I prefer, simply for convenience, the construction shown, wherein the plug $d$ and the cap $d^2$ are in one piece, the latter being of such diameter as to fit nicely within the upper end of the pipe D and is secured therein by suitable screws $d^3$.

The interior of the main portion B is made sufficiently large to form an air-chamber F, surrounding the upper end of the air-supply pipe D, which air-chamber communicates with the air-chamber $B^2$ by means of a plurality of radially-disposed passage-ways $f$, as shown. The diameter of the air-supply pipe D is such with relation to the interior diameter of the burner E that a vertically-arranged passage-way $F'$ will be formed exterior to said pipe D, the upper end of said passage-way $F'$ communicating with the lower end of the air-chamber F.

Below the burner E is located an air-spreader G, which consists of a radially-disposed disk, the outer diameter of which is almost equal to that of the burner E. The spreader G is provided with a depending hub $g$, centrally apertured, so as to fit snugly around the air-supply pipe D, while the set-screw $g'$ will serve to secure the two together. The upper face of the disk G is preferably concaved somewhat, as shown at $g^2$, whereby air that enters the air-supply pipe D and passes through the apertures $d'$ into the air-chamber F down through the annular passage-way $F'$ will strike the dished or concaved surface $g^2$ and thereby be given a slightly upward and outward direction at the point adjacent to the gas-exits $e^2$ of the burner E. It will be noticed that the spreader-plate G is located quite close to the burner E, and thus an annular flame of ignited gas downwardly directed will be crossed by an upwardly-directed annular sheet of air. It will also be noted that some of the air that enters the chamber F will pass through the radial openings $ff$ into the air-chamber $B^2$ and thence out through the vertically-arranged openings $b^3$ in the flanges $b'$. The gas issuing radially from the openings $e^2$ is thus not only crossed by the upward current of air sent out from the spreader-plate G, but is met by the downwardly-directed currents of air that pass out through the said openings $b^3$. A most thorough and advantageous mixture of air and gas is thus produced and a brilliant white light is the result. I prefer to surround the body portion B B' with a porcelain cap or cover H, as shown, and I also prefer to cover the lower portion of the burner—to wit, the pipe D and the spreader-plate G—with a porcelain cover H'; but this feature may be dispensed with if necessary. When present, it adds to the appearance of the burner.

The air-supply pipe D is secured by a screw $d^3$ to an annular downwardly-extending flange $i$ of the chimney-holder I. The end of the air-supply pipe D is closed by a cap D', which is provided with a tubular extension $d^4$, which latter is of a diameter sufficient to allow it to be entered into the interior of the lower part of the supply-pipe D and have a rotating contact therewith, a shoulder $d^5$ limiting the movement thereof. Suitable apertures $d^6$ $d^7$ in the end of the air-supply pipe D and in the extension $d^4$ serve to permit the regulation of the inflow of air therethrough to the interior of the air-supply pipe D. As shown in Fig. 1, the passages $d^6$ $d^7$ are in perfect registry, whereby the maximum amount of air may be admitted, but upon rotating the cap D' the extension $d^4$ will tend to close the openings $d^6$, and thus the admission of air to the interior of the burner may be regulated as desired.

The chimney-holder I is an annular horizontally-arranged plate provided on its outer margin with the usual upturned flange $i'$ and with the chimney-retaining screws $i^2$, which pass through suitable apertures in said flange $i'$.

I' is any suitable chimney arranged to be secured in the chimney-holder I. A suitable aperture $i^3$ is arranged in the chimney-holder I, through which a match may be inserted when it is desired to apply light to the gas as it issues for the first time through the burner-openings $e^2$. When the match is withdrawn, the opening $i^3$ may be closed by a plate $i^4$, pivotally secured to the lower side of the chimney-holder I by means of a pivot-screw $i^5$. A further supply of fresh air may be admitted to the interior of the chimney I' beneath the burner and exterior to the air-supply pipe D by means of a plurality of apertures or air-inlets J, formed in the depressed portion of the chimney-holder I. This portion of the holder I is depressed only for the purpose of thereby forming a shoulder $j$, upon which may be placed a perforated metal spreader-plate J'. Of course the plate could be bent and properly secured to the upper surface of the holder I; but I prefer the construction shown, because it affords a shallow chamber $j'$ beneath the plate J', into which the air will flow after it comes through the apertures J. A suitable annular regulating damper-ring $J^2$ is placed beneath the depressed portion of the holder I in a rectangular annular groove formed between the upper end of the flange $i$ and the annular flange $i^6$, said damper-ring $J^2$ being held in position by the heads of the screws $j^2$, which enter said flange $i^6$ and which overlap the outer margins of the regulating-ring or damper $J^2$. Said ring $J^2$ is provided with a plurality of openings $J^3$ therethrough, which register as the ring is properly turned with the openings J in the chimney-holder I. The number and size of the openings in the upper portion of the burner first described of course is predetermined and cannot be regulated after the parts are assembled, but the amount of air admitted to the interior of the chimney I' through the apertures J can be regulated by the user, who also has convenient access to the sliding apertured plug D', through which the admission of air to the air-pipe D may be regulated.

By the combined use of the valve at the end of the air-supply pipe D and the damper J, I am enabled to control the character of the flame at will. By allowing a free flow of gas and a maximum flow of air through the interior of the burner, by reason of the special construction thereof, a brilliant white light is produced. If, however, the supply of gas is lessened and the air allowed to pass through the apertured holder, the volume of flame will not be reduced, but it will be of a milder character and more suitable for many purposes. Thus the light may be varied from a brilliant to a very mild and mellow flame without reducing its volume and with a very economical expenditure of gas.

Where the burner is hung in a place subject to severe drafts or currents of air, I sometimes shield the openings $d^6$ $d^7$ by means of an annular metal shield K, suitably secured at its upper end to the outside of the flange $i^6$ or to the holder I. Air will thus be prevented from going directly into the apertures $d^6$ $d^7$. In some instances I provide a plurality of apertures $k$ in the apron K.

Referring now to the modifications shown in Fig. 2, the main parts described are the same as those shown in Fig. 1, with the following exceptions: The gas-tube A in this instance is entered through a central aperture in the cap D', extends through the air-supply pipe D, and is secured to a threaded aperture in the head $d'$, the latter having a central aperture $d^8$ through the plug $d$ and thus affords means of communication between the passage-way $a$ and the gas-chamber C. The body portion B is of course closed at $b^4$.

In operation the gas will pass through a pipe A into the chamber C, radially through the passage-ways $c$ $c'$ into the annular spreading-chamber C', thence downwardly and outwardly through the gas-exit openings $e^3$. Air will pass through the openings $d^6$ $d^7$ to the interior of the air-supply pipe D, upwardly into the air-chamber F, where the current of air will be divided, a portion of the air passing outwardly through the apertures $f$ into the air-chamber $B^2$, and thence out upon the gas, while the other portion of the air upon leaving the chamber F will pass downwardly through the passage-way F' onto the spreader-plate G and thence be directed outwardly in a thin sheet against the under side of the gas. The gas may be ignited by a lighted taper being inserted through the opening $i^3$, and the light may be regulated by turning the damper-ring $J^2$ and adjusting the cap D'.

I have found after careful and repeated experiments that the burner disclosed hereinabove has a mechanical construction that permits of the most desirable admixture of gas and air and one which in operation produces a most luminous and brilliant white light with the expenditure of the minimum amount of gas. The burner is easy of manufacture and the parts may readily be assembled by unskilled labor. There are no complicated parts to get out of order, and the construction, while simple, is relatively cheap, inasmuch as the life of the burner is very much greater than that of ordinary burners. I find also that it is possible to regulate the inflow of air and to thus regulate to a nicety the proper admixture of air and gas to produce the very best results.

What I claim as my invention, and desire to secure by Letters Patent, is as follows:

1. In a gas-burner, the combination with a body portion provided interiorly with an air-chamber and means for supplying air thereto, of a gas-burner ring secured to said body portion and provided with annularly-arranged, downwardly and outwardly extending apertures for the passage of gas therethrough, means for supplying gas to the burner proper, a concave annular spreader-plate of substantially the same diameter as the burner-ring located below and in such proximity to the burner as to form a contracted air-exit opening adjacent to the apertures in the burner-ring, and a conduit or air-passage communicating at one end with the air-chamber in the body portion and at the other end in said contracted air space or opening, whereby a volume of air will be forced radially upward through the downwardly and outwardly directed flame, substantially as described.

2. In a gas-burner, the combination with a body portion provided with radially-separated air-chambers, a passage connecting said chambers, means for supplying air to one of said chambers, an annular burner-ring secured upon the under side of said body portion provided in its lower margin with a plurality of gas-exit apertures, an annular concave spreader-plate subjacent to the said burner-ring and having between the same and the said ring an annular air-space and at the outer edges thereof adjacent to said gas-exit openings a contracted slit for the passage of air, a passage connecting said inner air-chamber and annular air-space between said spreader-plate and burner-ring, means for directing the air from the outer chamber upon the flame, and means for supplying gas to the burner, said spreader-plate being so formed and so located with relation to the burner-ring as to direct the air outwardly therefrom, substantially at right angles to the gas issuing from said burner-ring.

3. In a gas-burner, the combination with a hemispherical body portion provided with two air-chambers, radially-arranged passage-ways connecting said air-chambers, an air-supply pipe communicating with the inner air-chamber, an annular gas-burner secured to said body portion, annularly-arranged gas-exit apertures in the lower outer edge of said burner, and arranged to discharge the gas outwardly and downwardly, an annular concave spreader-plate beneath the gas-burner proper and in such proximity thereto as to form a space between the plate and the burner, and forming also an annular contracted opening immediately adjacent the exhaust-openings in the outer edge of the burner, which is adapted to direct the air upwardly and outwardly through said opening, an annular air-passage between the gas-burner and said air-supply pipe, communicating at its upper end with said inner air-chamber and at its lower end with the space between the burner proper and spreader-plate, a gas-chamber in the body portion communicating with the interior of the gas-burner, means for supplying gas to the chamber, and means for regulating the admission of air to the air-supply pipe, comprising a plurality of radially-arranged apertures through the lower end of said pipe, and an apertured thimble telescoping into the lower end of said pipe, the apertures of which are adapted to be brought into register with the apertures of the pipe to regulate the flow of air therethrough as desired, substantially as described.

4. A gas-burner comprising a burner-body of generally hemispherical form arranged with its flat side downward, an air-chamber occupying the central part of said burner-body, an annular peripheral air-chamber provided at its top with a pyramidal wall, a plurality of radially-extending air-passages providing communication between the upper parts of the central and peripheral air-chambers, an annular gas-chamber located radially between said peripheral and central air-chambers provided with an annular series of jet-openings opening through the bottom wall of the burner-body and terminating obliquely downwardly and outwardly, a concave disk mounted immediately below the body of the burner with its concave side uppermost and with its perimeter arranged closely to the annular series of jet-openings, so as to form, in conjunction with the lower side of the burner-body, a chamber having a narrow circumferential slit opening, a relatively large central air-tube communicating at its upper end with the central chamber of the burner-body, an annular air-space leading from the central air-chamber to the space between the concave disk and burner-body, and a gas-supply inlet communicating with the annular gas-chamber, substantially as described.

5. In a gas-burner the combination of a hemispherical body portion having two air and one gas annularly-arranged chambers therein each communicating with the lower end of said body portion and a second gas-chamber near the upper end of the body portion, means for supplying gas to the last-mentioned chamber, radially and downwardly arranged passage-ways for conducting gas from said upper gas-chamber to the gas or central one of the lower chambers, an annular ring constituting a gas-burner proper secured to said body portion and provided with an annular gas-chamber adapted to register with the said lower central gas-chamber, said burner being provided at its lower margin with a plurality of openings terminating obliquely downwardly and outwardly for the passage of gas therethrough, a perforated spreader-plate separating the said lower central gas-chamber and the gas-chamber in the burner proper, radial passage-ways connecting the inner and the outer air-chambers in the body portion proper, a relatively large, centrally-arranged air-supply tube connecting with the central air-chamber and means, substantially as stated, for permitting the air to escape therefrom both above and below the gas-flame, substantially as described.

6. In a gas-burner, the combination of a gas-supply pipe with a hemispherical body portion provided with a gas-chamber communicating with said gas-supply pipe, a second gas-chamber in the body portion, radial passage-ways connecting the two gas-chambers, a gas-burner proper comprising a ring provided with a gas-chamber registering with the last-mentioned gas-chamber of the body portion and provided with a plurality of gas-exit openings at the margin of the ring arranged obliquely downwardly and outwardly, a perforated spreader-plate separating the gas-chamber in the burner-ring from the adjacent gas-chamber in the body portion, an enlarged air-supply tube secured centrally of the body portion communicating at its upper end with an air-chamber, an annular space between the gas-burner ring and said air-passage connecting at its upper end with the air-chamber in the body portion, a spreader-plate secured to the air-supply tube having its concaved portion adjacent to the burner-ring, of such diameter and so located with respect to the latter as to form a marginal, narrowly-contracted opening adjacent to the gas-exit openings for the passage of air from beneath to the flame, a second part or member as B' of the body portion proper provided with an inwardly-directed annularly-apertured flange, an air space or chamber between said member and the body portion, radial passage-ways for connecting the two air-chambers, means for connecting the supply of air to the air-tube, a chimney-holder secured to the air-supply tube, the air-supply tube outside of the body portion of the burner being covered by porcelain all arranged and operating substantially as described.

7. In a gas-lamp, the combination with the body portion provided with two radially-arranged air-chambers and with a burner, said burner being provided with a plurality of outwardly and downwardly extending gas-exit apertures on the lower margin thereof, means for supplying gas to the burner, a concave spreader-plate subjacent to the burner and forming between the same and the burner adjacent to said gas-exit apertures a contracted slit for the egress of air, a pipe for supplying air to one of said chambers, means for directing the air from the inner chamber to the space between the spreader-plate and burner, an apertured chimney-holder through which the air may be directed to the outside of the burner, a chimney on said holder, means for regulating the supply of air to the interior and exterior of the burner comprising a regulating-valve in the air-supply pipe, and a damper mounted on the chimney-holder and adapted to regulate the supply of air therethrough.

8. In a gas-lamp, the combination with a burner comprising a body portion provided interiorly with an air-chamber, a pipe for supplying air thereto, an apertured chimney-holder secured to said pipe, a chimney on said holder, a gas-burner comprising a hollow ring secured to said body portion and provided with annularly-arranged, downwardly and outwardly extending apertures for the passage of gas therethrough, means for supplying gas to the burner, a concave annular spreader-plate of substantially the same diameter as that of the burner-ring located below and in such proximity to said burner as to form a contracted air-exit opening adjacent to the apertures in the burner-ring, and an air-passage communicating at one end with the air-chamber in the body portion and at its other end with the contracted air space or opening, of a rotating apertured damper secured to said chimney-holder, a series of radial apertures in the lower end of the air-supply pipe, and a rotatable apertured thimble telescoped upon said apertured end of the pipe, whereby the supply of air to the burner both from within and without may be regulated as desired, substantially as described.

9. In a gas-lamp, the combination with a burner, comprising a body portion provided with a central air-chamber and with an air-supply pipe, an apertured chimney-holder secured to said pipe, a chimney on said holder, a gas-burner secured to said body portion, provided on its outer edge with downwardly and outwardly directed gas-exits, means for supplying gas to the burner, a concave annular spreader-plate located below said burner and in such position as to form between the outer edge of the same and the annular burner a contracted air-exit, an air-passage connecting said central air-chamber and narrow air-exit, of an apertured damper mounted on the chimney-holder to rotate thereon, a series of radial apertures in the lower end of the air-supply pipe, and a rotatable apertured thimble telescoped in said pipe, whereby the supply of air to the burner both from within and without may be regulated as desired by adjusting said damper and thimble upon their engaging parts in various relations to each other.

10. In a gas-lamp, the combination with a body portion provided with an air-chamber and with a burner, said burner being provided with a plurality of gas-exit openings in its lower margin, means for directing the air in a thin sheet upon the issuing gas and substantially at right angles thereto and for also directing the air downwardly upon the flame radially outside of said gas-exit apertures, a pipe for supplying air to said chamber, an apertured chimney-holder mounted on said pipe, of means for regulating the supply of air to the interior and exterior of the burner comprising a regulating-valve in the supply-pipe, a damper mounted on the chimney-holder and adapted to regulate the supply of air therethrough.

In testimony that I claim the foregoing as my invention I affix my signature, in presence of two witnesses, this 2d day of January, A. D. 1896.

WILLIAM D. SMITH.

Witnesses:
ALBERT H. GRAVES,
WILLIAM L. HALL.